US009088527B2

(12) United States Patent
Manor et al.

(10) Patent No.: US 9,088,527 B2
(45) Date of Patent: Jul. 21, 2015

(54) METHOD AND SYSTEM FOR COMMUNICATION SESSION BANDWIDTH CONTROL BASED ON ACTUAL BANDWIDTH USAGE

(75) Inventors: Moni Manor, Santa Clara, CA (US); Parameshwaran Krishnan, Basking Ridge, NJ (US); Jon Louis Bentley, New Providence, NJ (US); Gregory Thomas Osterhout, Coppell, TX (US); Peter George Tarle, Belleville (CA); Alex Beck, Frenchs Forest (AU)

(73) Assignee: Avaya Inc., Basking Ridge, NJ (US)

( * ) Notice: Subject to any disclaimer, the term of this patent is extended or adjusted under 35 U.S.C. 154(b) by 609 days.

(21) Appl. No.: 13/023,192

(22) Filed: Feb. 8, 2011

(65) Prior Publication Data

US 2012/0201255 A1 Aug. 9, 2012

(51) Int. Cl.
*H04L 12/923* (2013.01)
*H04N 21/2385* (2011.01)
*H04N 21/24* (2011.01)
*H04N 21/4223* (2011.01)
*H04N 21/4402* (2011.01)
*H04N 21/4788* (2011.01)

(52) U.S. Cl.
CPC .......... *H04L 47/762* (2013.01); *H04N 21/2385* (2013.01); *H04N 21/2402* (2013.01); *H04N 21/4223* (2013.01); *H04N 21/440227* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 6,973,315 B1 | 12/2005 | Miernik et al. | |
| 7,349,704 B2 | 3/2008 | Miernik et al. | |
| 2002/0120745 A1* | 8/2002 | Oishi et al. | 709/226 |
| 2003/0221008 A1* | 11/2003 | England et al. | 709/226 |
| 2004/0057461 A1* | 3/2004 | Dawidowsky et al. | 370/468 |
| 2007/0016688 A1* | 1/2007 | Hester et al. | 709/238 |
| 2008/0075116 A1* | 3/2008 | Holierhoek et al. | 370/468 |
| 2009/0279568 A1* | 11/2009 | Li et al. | 370/468 |
| 2011/0182303 A1* | 7/2011 | Le Faucheur et al. | 370/468 |
| 2011/0205933 A1* | 8/2011 | Porat | 370/254 |
| 2012/0201255 A1* | 8/2012 | Manor et al. | 370/468 |

OTHER PUBLICATIONS

Cisco White Paper entitled "The Economics of Switched Digital Video," by Hardy et al., www.cisco.com/.go/sdv; consisting of 6-pages.
Cisco White Paper entitled "Cisco MPLS AutoBandwidth Allocator for MPLS Traffic Engineering: A Unique New Feature of Cisco IOS Software": www.cisco.com/warp/public/cc/pd/iosw/prodlit/mpatb_wp.htm consisting of 4 pages dated Jul. 20, 2010.
Anjali et al., "A New Scheme for Traffic Estimation and Resource Allocation for Bandwidth Brokers," Computer Networks Publication, vol. 41, pp. 761-777 (2003).

* cited by examiner

*Primary Examiner* — Chirag Shah
*Assistant Examiner* — Amar Persaud
(74) *Attorney, Agent, or Firm* — Christopher & Weisberg, P.A.

(57) ABSTRACT

A method and system for allocating bandwidth among communication sessions are disclosed. In one embodiment, a method includes performing a first allocation to a first communication session and performing a second allocation to a second communication session. The method includes performing a reallocation of bandwidth from the first communication session to the second communication session based on a predetermined criteria.

17 Claims, 9 Drawing Sheets

METHOD AND SYSTEM FOR COMMUNICATION SESSION BANDWIDTH CONTROL BASED ON ACTUAL BANDWIDTH USAGE

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a method and system for administering communication sessions, and more particularly to allocating bandwidth among users in a communication sessions.

BACKGROUND OF THE INVENTION

A video conference uses a set of interactive telecommunication technologies which allow two or more locations to interact via multi-way video and audio transmissions simultaneously. A video conference bridge exchanges video streams with clients over wide area network (WAN) links. The core technology used in a videoconferencing system is digital compression of audio and video streams in real time. The hardware or software that performs compression is called a codec (coder/decoder). Compression rates of up to 1:500 can be achieved.

Presentation and transmission of video and multimedia data, even when compressed using state of the art codecs, requires a large amount of bandwidth. For example, a 1280× 720 30-frame/sec video stream can easily consume the bandwidth of an access link such as a 1.544 Megabit/second T1 link. Bandwidth on wide area network (WAN) links, especially at the service levels required for real-time communication, is expensive. When a video conference bridge processes a request to start a new conference or join an additional client to an existing conference, one of the factors that the bridge must consider is whether the additional video and audio streams will overload any WAN links. A simple test used is to determine whether a maximum bit rate of a new stream plus the sum of maximum bit rates of established streams is less than the link bit rate. However, since the actual bit rate of a video stream varies with time, this approach is inefficient as it can leave a fair amount of bandwidth unused. For example, while it may first appear that the addition of the new stream will overload the link, conditions may exist where the current stream requirements will lessen, e.g., muting audio, less movement in the room, etc. The result is that a new session may be denied when in fact unused bandwidth is or may become available. Therefore, what is needed is a more efficient way of allocating bandwidth among communication sessions such as video conferences.

SUMMARY OF THE INVENTION

The present invention advantageously provides a method and system for allocating bandwidth in a communication system that establishes communication sessions among a plurality of users. According to one aspect, the invention provides a method that includes performing an initial allocation of bandwidth to a first communications session and to a second communication session. Subsequently, a reallocation of bandwidth occurs that is based on a predetermined criteria.

According to another aspect, the invention provides a multimedia collaboration server having a memory and a processor. The memory stores committed bandwidths, effective bandwidths, and residual bandwidths for each of a plurality of communication sessions. The processor stores committed bandwidths, effective bandwidths, and residual bandwidths in the memory. The processor also determines a residual bandwidth that is a difference between a committed bandwidth for a first session of the plurality of communication sessions and an effective bandwidth for the first session. The processor also allocates a fraction of the residual bandwidth to a second session based on the plurality of communication sessions on predetermined criteria.

According to yet another aspect, the invention provides a computer readable tangible medium having instructions that when executed by a processor cause the processor to perform operations to allocate bandwidth among a plurality of communication sessions. The operations include determining a residual bandwidth associated with a first communication session. The operations also include allocating a percentage of the residual bandwidth to a second communication session based on predetermined criteria.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it is noted that the embodiments reside primarily in combinations of apparatus components and processing steps related to implementing a system and method for allocating bandwidth among communication sessions. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
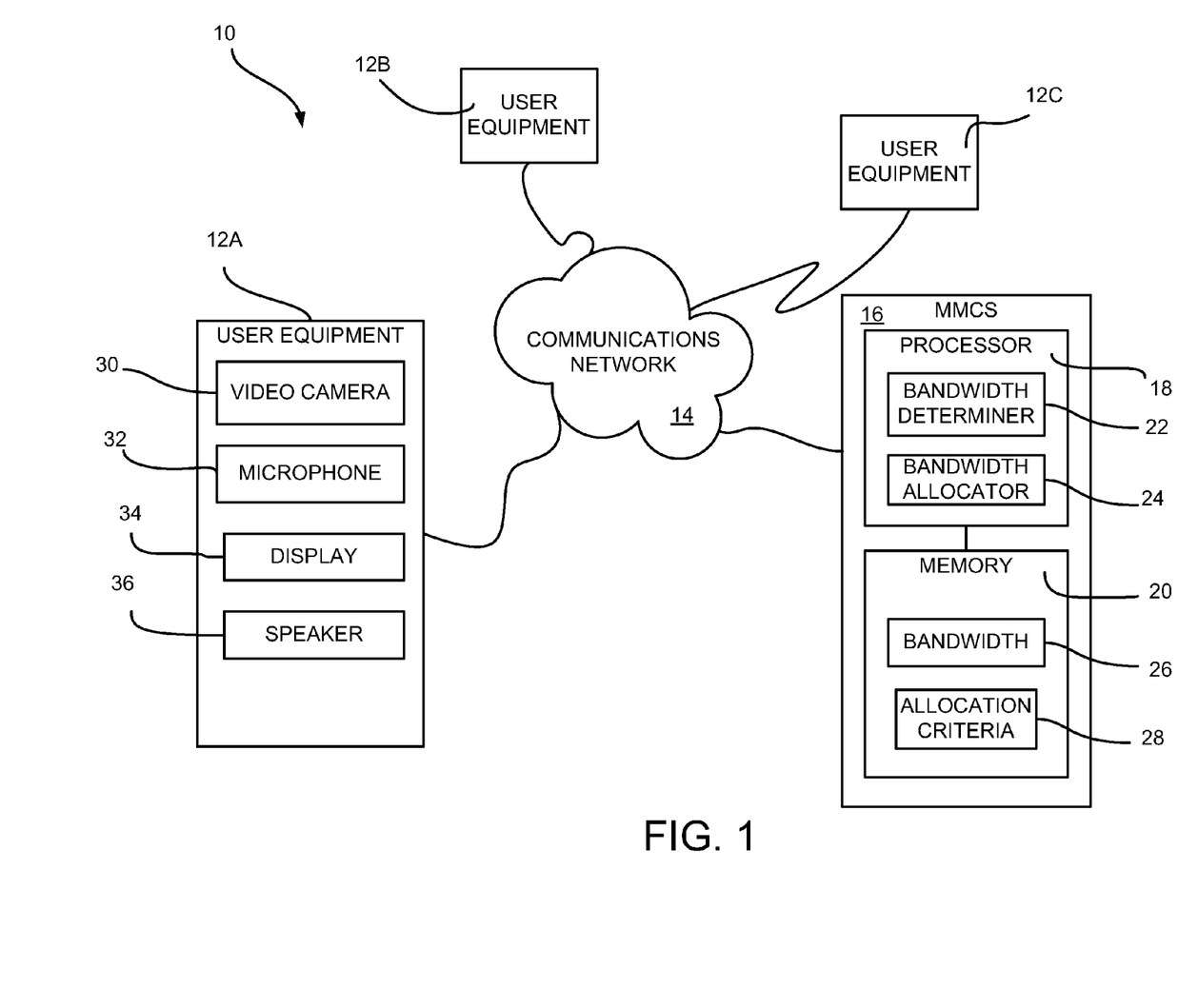
FIG. 1 is block diagram of an exemplary communication system constructed in accordance with the principles of the present invention.

Referring now to the drawing figures in which like reference designators refer to like elements, there is shown in FIG. 1 a multimedia collaboration system constructed in accordance with the principles of the invention and generally denoted as "10". The system 10 includes a plurality of items of user equipment 12A, 12B, and 12C, referred to herein collectively as user equipment 12. The user equipment 12 is communicatively coupled to a communication network 14, which may be a local area network (LAN), a wide area network (WAN), and/or the Internet, and may include the Public Switched Telephone Network, a wireless telecommunication network or other communication network. A multimedia collaboration server (MMCS) 16 is also communicatively coupled to the user equipment 12 via the communication network 14. The MMCS 16 enables communication sessions between users of the equipment 12, wherein each user can see and hear each other user contemporaneously. The connections of the user equipment 12, the communication network 14 and the MMCS 16 may be wireless, by wire or by optical fiber.

The MMCS 16 has a processor 18 and a memory 20. The processor 18 performs session-oriented functions that include establishing and maintaining a communication session between the users 12, allocating bandwidth to the session, and determining actual bandwidth used by the session. Accordingly, the processor 18 may include a bandwidth determiner 22 and a bandwidth allocator 24. The bandwidth determiner 22 may interact with user equipment that includes networking elements, such as routers, to determine bandwidth use. The memory 20 stores bandwidth values 26 including committed bandwidth, effective bandwidth and residual bandwidth. Committed bandwidth is bandwidth allocated to the session. Effective bandwidth is bandwidth actually used by the session, and residual bandwidth is the difference between the committed bandwidth and the effective bandwidth.

The memory 20 also stores bandwidth allocation criteria 28, upon which bandwidth allocations are based. Bandwidth allocation criteria 28 may include, for example, historical bandwidth usage, the probability that effective bandwidth exceeds a predetermined threshold value, the likelihood that a user will mute audio data, the likelihood that a user will suppress video data, a required data rate, a priority associated with a user or a session, a cost of reallocation impacting quality of service, a probability of lost information or a denial of service, and other criteria.

The user equipment 12 may include a computer or laptop or other device that enables a user to communicate with other users. For example, the user equipment may include a video camera 30 to capture moving pictures and transmit them as Motion Pictures Expert Group (MPEG) data to the network 14. Other video processing standards may be implemented. The user equipment may also include a microphone 32 to capture and transmit audio data to the network 14. The user equipment may also provide a display 34 and a speaker 36 to produce video and audio data of a communication session received from the network 14.

Figure 2:
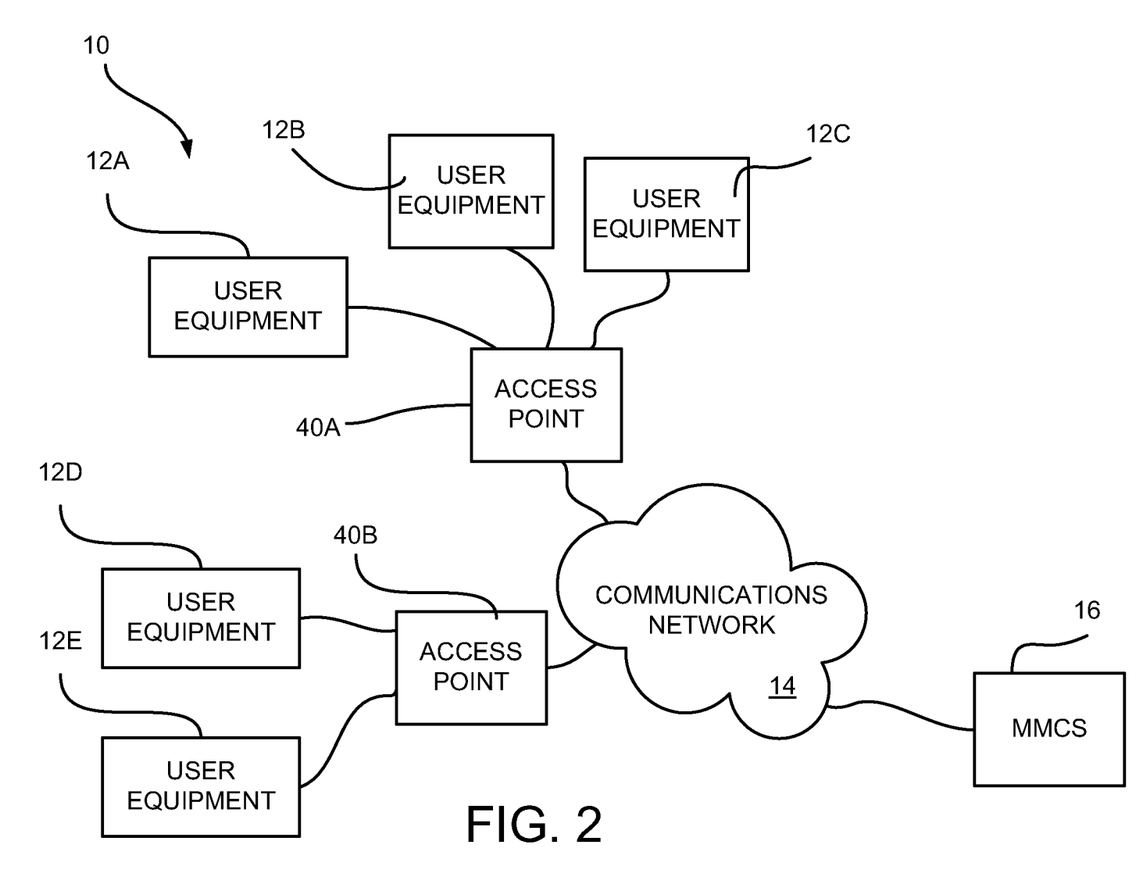
FIG. 2 is a block diagram of another exemplary communication system constructed in accordance with the principles of the present invention.

FIG. 2 shows a system 10 that has multiple users' equipment 12 connected through the communication network 14 to an MMCS 16 via access points 40A and 40B. Each access point may serve a separate local area network and, in conjunction with the MMCS 16, may enable simultaneous multiple communication sessions. For example, one session may include user equipment 12A, 12B and 12D, whereas another simultaneous session may include user equipment 12C and 12E. The term user equipment, as used herein, may include video room units, security cameras and other equipment that may not be associated with a particular user. Also, the user equipment may be located at a single site or a plurality of distributed sites, Further, user equipment may include networking equipment such as routers. Thus, the user equipment 12 may be connected to other user equipment downstream from the MMCS. The MMCS 16 may provide video teleconferencing according to standards such as the International Telecommunications Union (ITU) H.320 for public switched telephone networks, and H.264, which is a video compression standard for Internet Protocol (IP) networks. In one embodiment, to participate in a session, each user dials in to or links to the MMCS 16. The MMCS 16 functions as a bridge, enabling video-audio data from each participant to be sent to the other participants. Or alternatively, bridging functions may be implemented by a separate media server co-located with the MMCS 16.

Thus, one embodiment is a multimedia collaboration server (MMCS) in a communication network for providing communication sessions to a plurality of users. The MMCS 16 allocates bandwidth to a communication session. The MMCS memory 20 also stores committed bandwidths, effective bandwidths, and residual bandwidths for each session. The processor 18 is in communication with the memory 20 and includes determining a residual bandwidth that is a difference between a committed bandwidth for a first session and an effective bandwidth for the first session. The processor 18 also allocates a fraction of the residual bandwidth to a second session based on predetermined criteria. In some embodiments, the processor 18 partitions a bandwidth request received upon admission of a user to a session into a minimum required bandwidth and an optional bandwidth. The optional bandwidth may correspond to an enhanced service layer or attribute. The enhanced service layer may correspond to a specified data rate. In some embodiment, the predetermined criteria includes a probability of default and/or a cost associated with the allocation.

The MMCS 16 allocates bandwidth according to predetermined criteria which may depend on network conditions. In a first network condition, there is little or no activity in the network, and consequently, there is ample bandwidth available to handle a new communication session. When the network is in this first condition, there is ample time to perform low priority background activities such as database synchronization. In a second network condition, there is significant bandwidth usage, with a medium number of communication sessions being initiated, maintained, and terminated. In this second condition, there is adequate bandwidth available to provide minimal requirements for voice and video data service as well as requested optional enhancement layers. Optional enhancement layers include higher data bit rates and higher video frame rates. These higher rates enhance the experience of the user by producing, for instance, faster motion video with increased resolution and higher quality sound.

In a third network condition, there is high bandwidth usage, with a high number of communication sessions being initiated, maintained, and terminated. In this condition, bandwidth may not be available to service all sessions with optional enhancements. When a new session is initiated, it may be necessary to re-allocate bandwidth from optional enhancement of existing sessions to provide basic services to the new session. In a fourth network condition, there is maximum bandwidth usage, with a high number of sessions being initiated, maintained, and terminated. In this condition, there may be little or no available bandwidth to allocate to new low priority sessions. Also, in this condition, there is no optional enhancement bandwidth that can be re-allocated to new sessions. In fact, lower priority sessions may experience reduced bandwidth to allow bandwidth for higher priority sessions. Lower priority sessions may be allocated voice-only service, lower quality voice or video, or the lower priority sessions may be dropped completely. This is undesirable and to be avoided when possible. In a fifth network condition, actual bandwidth usage exceeds network capacity, as determined by analysis of statistics, actual usage and loss of packets. In this condition corrective actions are required immediately. There is no optional bandwidth to reclaim, and in fact, service to high priority sessions may need to be downgraded.

Figure 3:
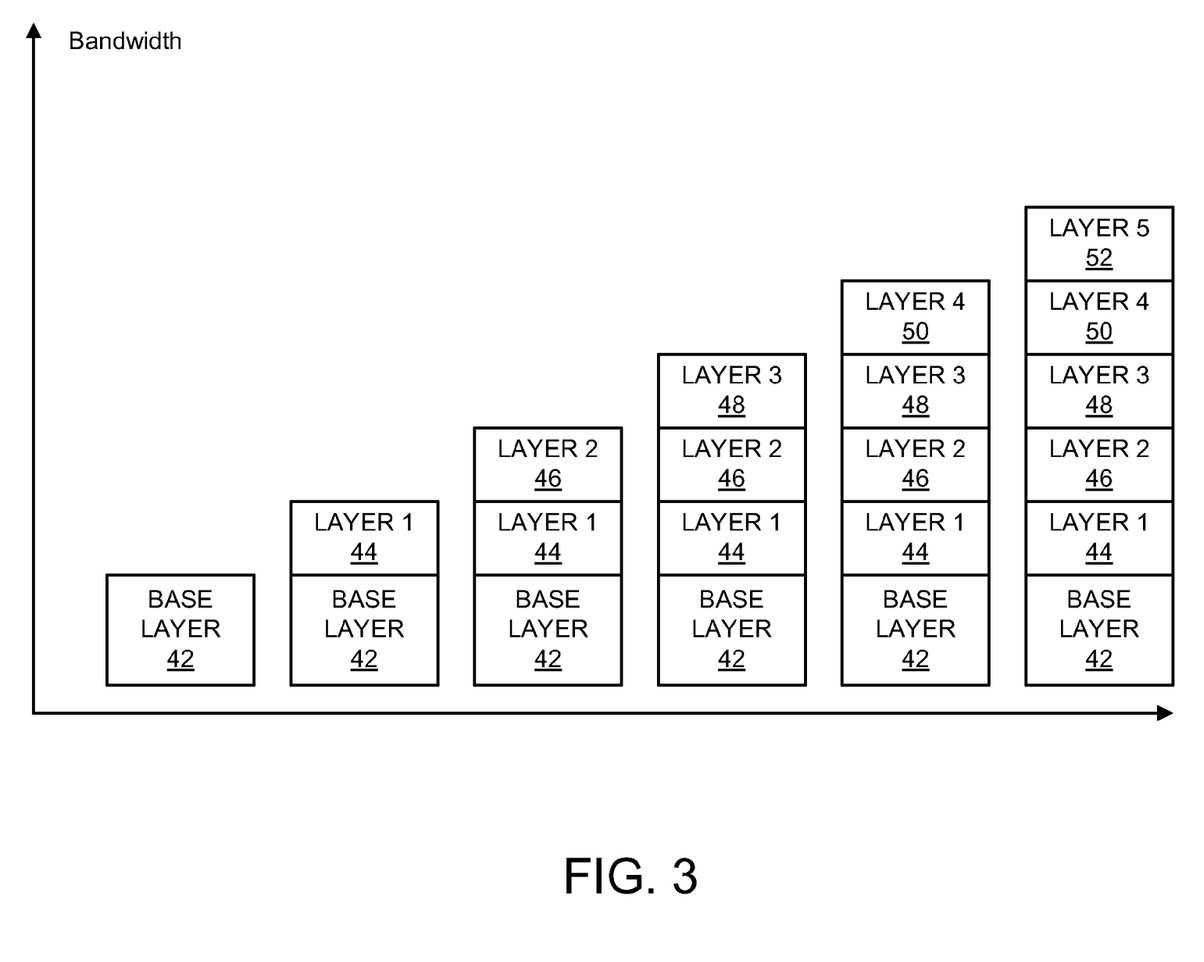
FIG. 3 is an illustration of enhanced layers of services allocatable to a communication session.

As discussed above, an amount of bandwidth allocated to a service determines whether optional enhanced levels may be provided. FIG. 3 shows an example of allocation units that may be employed by the MMCS 16. Referring to FIG. 3, in one embodiment, a base layer 42 of service provides video at a first video rate, for example, 7.5 frames per second (fps) and audio at a first audio rate of, for example, 24 kilobits per second (kbps). A first enhanced layer 44 may provide video at a second video rate, for example, 15 fps and audio at a second audio rate, for example, at 64 kbps. A second enhanced layer 46 provides video at 15 fps and audio at 128 kbps. A third enhanced layer 48 may provide video at 30 fps and audio at 192 kbps. A fourth enhanced layer 50 may provide video at 30 fps and audio at 256 kbps, and a fifth enhanced layer 52 may provide video at 30 fps and audio at 1 mega bits per second (mbps). Each successive enhancement layer requires more bandwidth. It is understood that the rates used in the above example are solely for ease of explanation. Persons of ordinary skill in the art will recognize other rates that can be used.

For example, when there are only a moderate number of simultaneous sessions, there may be enough bandwidth to allocate enough bandwidth to each session to provide enhanced layers of service, such as the fifth enhanced layer 52 discussed above. When new sessions are initiated and bandwidth usage increases, it may be necessary to reduce the level of enhanced layers provided to lower priority sessions. Thus, referring to FIG. 3, lower priority sessions may be provided with the fourth enhanced layer 50, whereas only one higher priority sessions may receive enhanced layer 52 service. When even more sessions are initiated, it may be necessary to downgrade service to some low priority sessions to voice only. Thus, a session may be allocated a minimum acceptable level of bandwidth plus one or more layers of optional bandwidth that may be reduced during peak utilization conditions.

Figure 4:
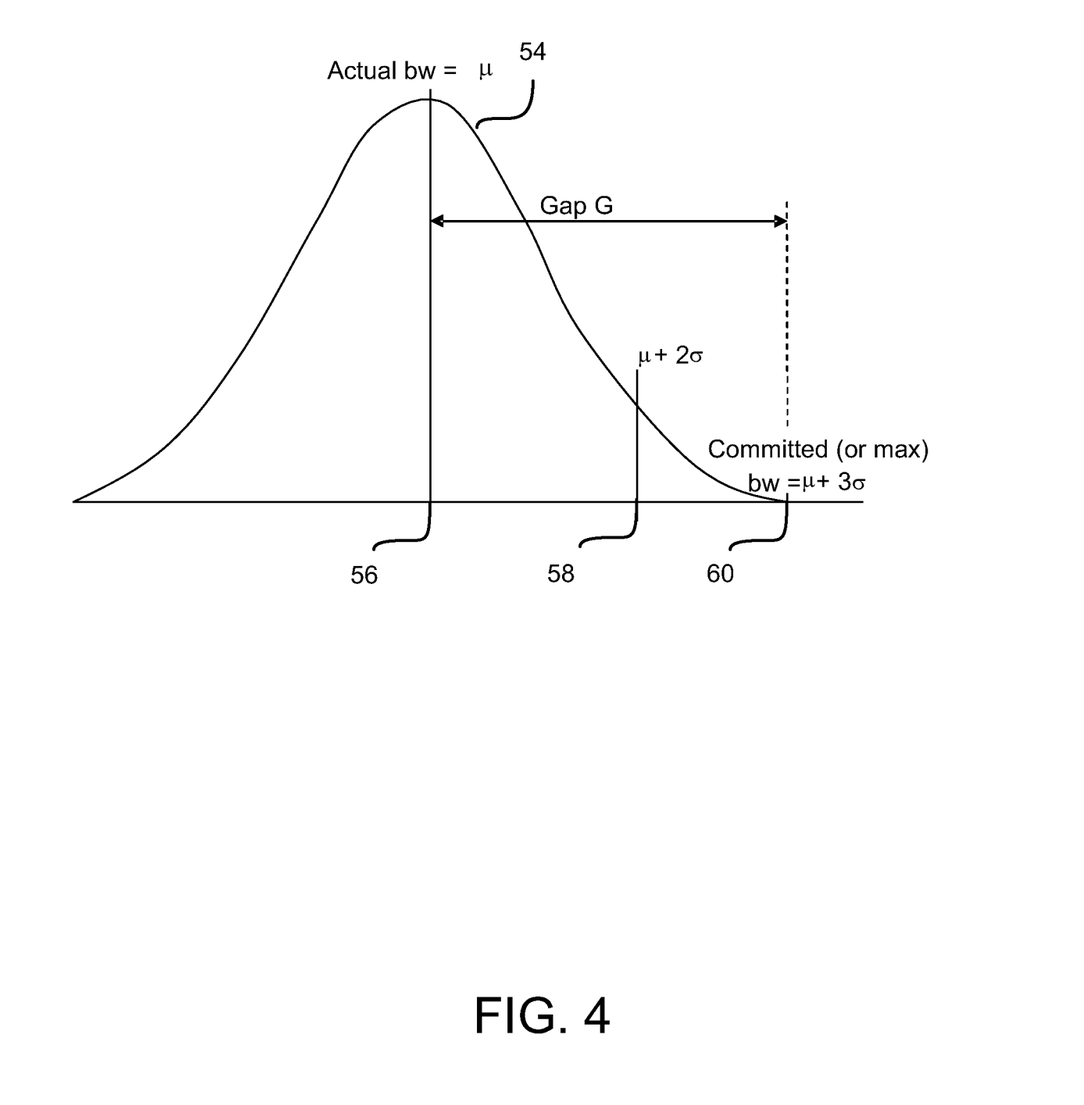
FIG. 4 is a probability distribution of bandwidth according to one embodiment of the invention.

FIG. 4 is a probability distribution 54 of a random variable that may represent actual bandwidth usage. The distribution for a random variable that represents actual bandwidth may be a normal distribution, i.e., Gaussian. For example, the average bandwidth utilization may be the mean $\mu$ 56 of a random variable. The probability that the random variable is less than the mean is 50%. The probability that the random variable is less than the mean plus one standard deviation, $\sigma$, $\mu+\sigma$ is about 84%, the probability that the random variable is less than $\mu+2\sigma$, 58, is about 97%, and the probability that the random variable is less than $\mu+3\sigma$, 60, is about 99.87%.

Suppose that the actual bandwidth used corresponds to the mean of the normal distribution 54, and the committed bandwidth is $\mu+3\sigma$. Then, reallocating one-third of the difference between the committed bandwidth and the actual bandwidth corresponds to a residual bandwidth of $2\sigma$. Thus, even with a one third reduction in bandwidth, the residual bandwidth is expected to be exceeded only less than 2.22% (100%-97.78%) of the time. The normal distribution may have a mean other than the actual bandwidth, with the area between actual and committed bandwidth being $5\sigma$ or $6\sigma$. The distribution may be estimated by measuring average bandwidth used, and the deviation from the average over time. The measurements can also include a number of defaults occurring in a given time. A default may be defined as a denial of service, or actual bandwidth exceeding capacity resulting in lost packets. A fraction X of reallocated bandwidth can be dynamically adjusted upward or downward, depending on a number of measured defaults over time. Based on such observations, an optimal value of X can be determined.

Consider a system having a maximum bandwidth capacity, C. When a new user arrives to join a session, a certain amount of bandwidth is requested for the user or the session. This amount of bandwidth, referred to herein as the committed bandwidth "cb", may be granted depending upon the amount of the bandwidth capacity that is available. The user or session will actually use a certain amount of bandwidth, referred to herein as the effective bandwidth "eb", that is less than the committed bandwidth. The effective bandwidth can be less than the committed bandwidth for many reasons. For example, the user may mute the audio portion of a communication session, or may minimize the video resolution.

The probability distribution for the expected bandwidth utilization can be estimated by estimating the probability of each bandwidth changing event. Estimating a probability of bandwidth changing events can be performed by accumulating observations of bandwidth utilization over time. Examples of bandwidth changing events include resizing windows, changing video quality, muting, and changing a number of windows displayed at one time. From the estimated probability distribution, the expected bandwidth utilization for a maximum acceptable cost can be determined, where the cost is a loss of quality of service, such as a degradation of video resolution or audio resolution.

Figure 5:
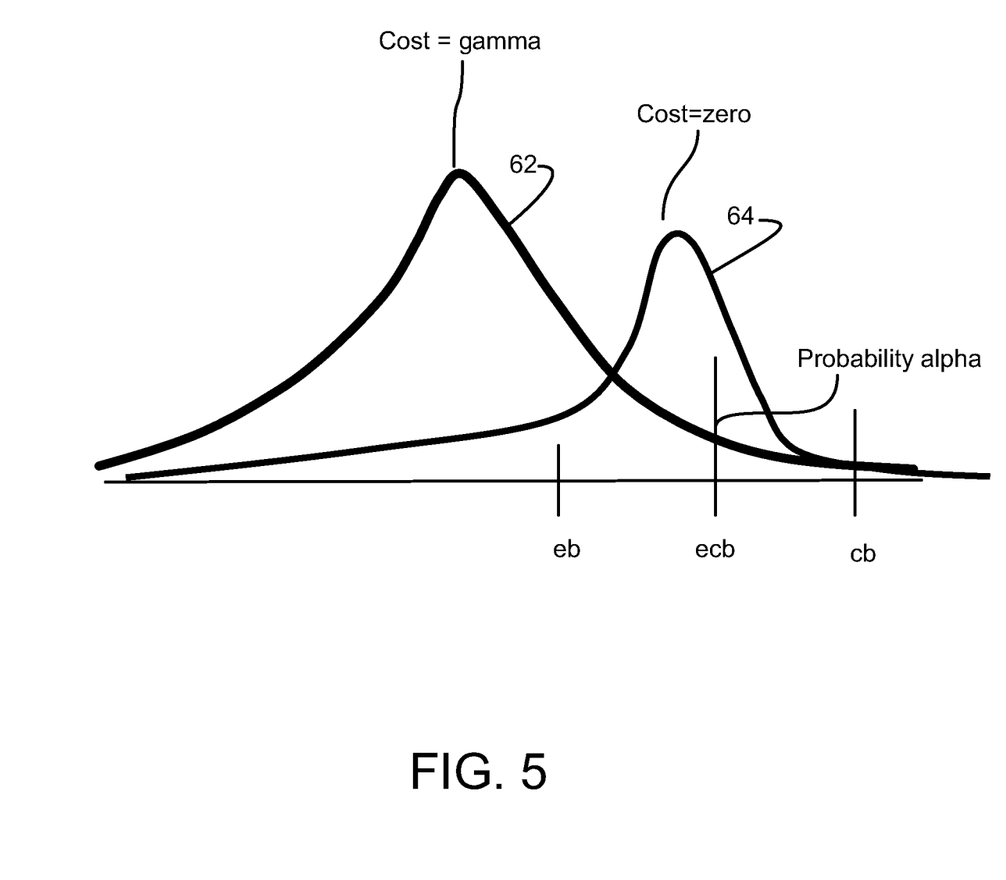
FIG. 5 is a diagram of a set of probability distributions of bandwidth for two different costs.

FIG. 5 illustrates distributions that show allocation of bandwidth based on cost. This "cost" is a metric and does not necessarily refer to dollars and cents. Referring to FIG. 5, two curves of a distribution of bandwidth are shown. One curve 62 is for a cost equal to a constant, gamma, $\gamma>0$, and a second curve 64 is for a cost equal to zero. In one embodiment, the cost curve is determined by assigning numerical values to default events or events associated with a loss of quality of service. For example, a cost of one unit may be assigned to reduction from layer 5 to layer 4 enhanced services. A cost of three units may be assigned to reduction from layer 5 to layer 3, and so forth. Note that when the cost $\gamma$ is greater than zero, the result is less bandwidth use and the curve is skewed to the left compared to the curve for $\gamma=0$. For a given cost, a minimum bandwidth that results in a default probability less than an amount a can also be determined. This minimum bandwidth may be referred to as the effective committed bandwidth, "ecb."

Thus, in one embodiment, an administrator, or computing device in the case of automatic bandwidth determination, specifies the maximum acceptable cost and the maximum acceptable probability of default. The administrator or computing device then may determine the effective committed bandwidth. Allocation of bandwidth can be steadily increased so long as the effective committed bandwidth is less than the capacity C. Thus, the administrator or the computer can increase the effective committed bandwidth to equal to C-Δ, where Δ is a small predetermined amount of bandwidth.

Figure 6:
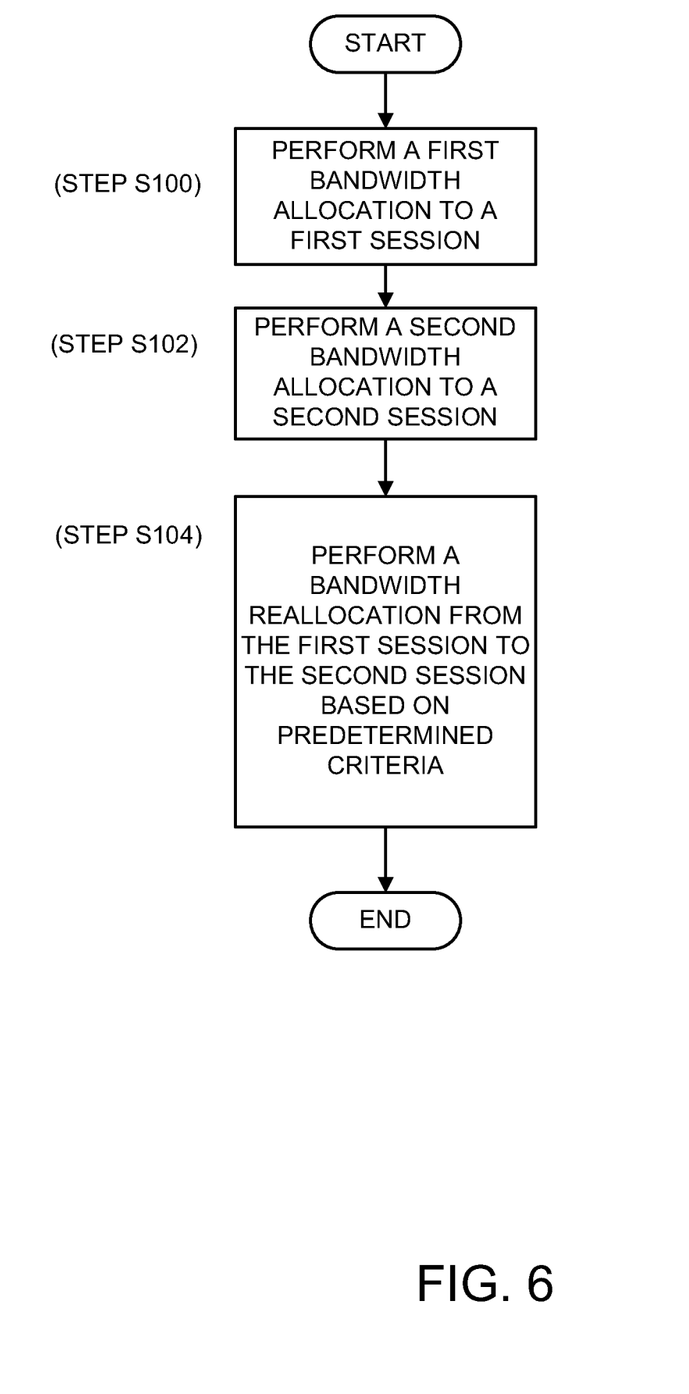
FIG. 6 is flow chart of an exemplary process for allocating bandwidth among communication sessions.

FIG. 6 is a flow chart of an exemplary process for allocating bandwidth from a first communication session to a second communication session. A first bandwidth allocation to a first session is performed (step S100). A second bandwidth allocation to a second session may be performed (step S102). Subsequently, a bandwidth reallocation from the first session to the second session is performed (step S104). This reallocation may be needed because, for example, a new user has joined the second session. The reallocation is based on a predetermined criteria. The predetermined criteria may include historical bandwidth usage, a priority of a session or a user, a desired quality of service, a cost of reallocation, a probability of default or denial of service, a likelihood that a user will choose a different level of service, a probability that an effective bandwidth of the second session exceeds a predetermined threshold value, and/or other criteria.

The reallocation of bandwidth may include reducing allocation to the first session by eliminating an optional layer of service, as shown in FIG. 3. For example, the removed optional layer of service may be associated with a first video frame rate and a first audio data rate, or the optional layer of service may be associated with a compression rate. For example, the video frame rate of the first service can be replaced with a lower frame rate, thus freeing up bandwidth which is now available for reallocation to the second session. The reallocation of bandwidth may also be to add an enhanced layer of service to the second session. The amount of bandwidth reallocated from the first communication session to the second communication session may be a fraction of a difference between the first allocation and an effective bandwidth used by the first communication session before the reallocation. In one embodiment, the effective bandwidth is associated with a mean value of a random variable and the first allocation is the mean value plus a factor times the standard deviation of the random variable. In some embodiments, the amount of bandwidth reallocated is based on a maximum acceptable cost and a maximum acceptable probability of default associated with a communication session.

Figure 7:
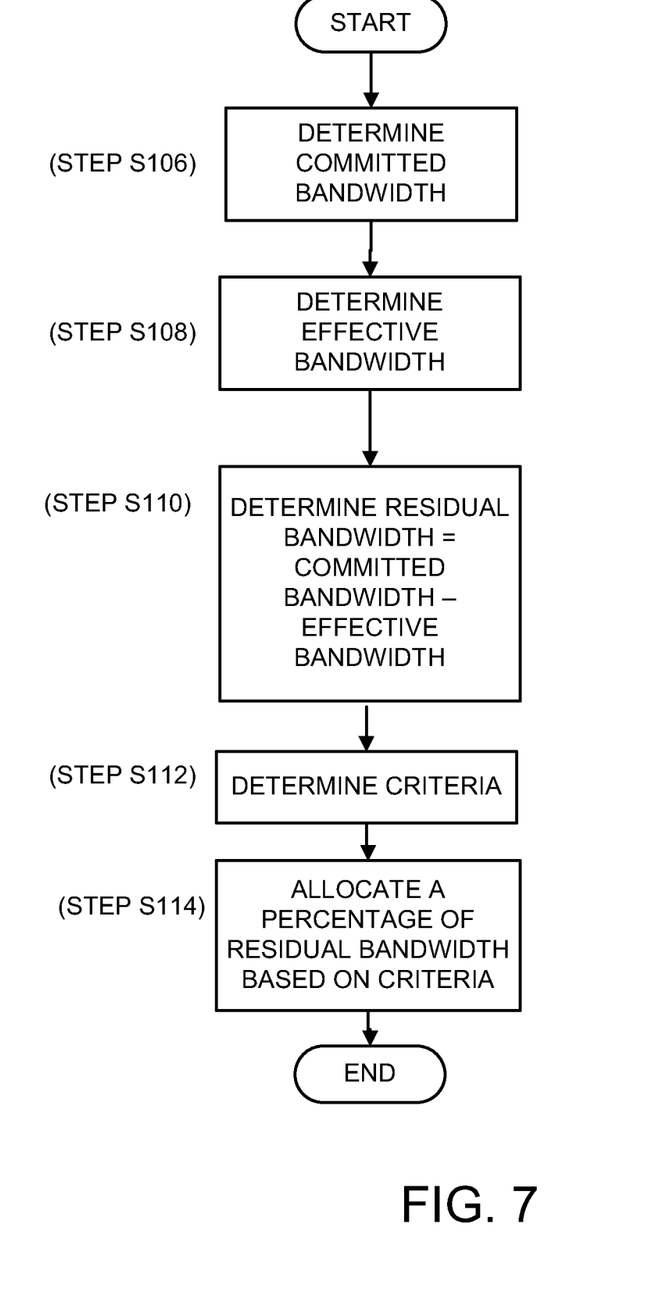
FIG. 7 is a flow chart of another exemplary process for allocating bandwidth among communication sessions.

FIG. 7 is a flow chart of an exemplary process for allocating bandwidth among a plurality of communication sessions based on a residual bandwidth. The process of FIG. 7 may be implemented by the processor 18 of the MMCS 16, as shown in FIG. 1. In a first step an amount of committed bandwidth is determined (step S106) by the bandwidth determiner 22 of the processor 18 of the MMCS 16. Then, the effective bandwidth is determined by the bandwidth determiner 22 in one or more ways, such as determining an average number of data packets transmitted per second, or a peak number of data packets transmitted during a time interval (step S108). A residual bandwidth is determined as the difference between the committed bandwidth and the effective bandwidth (step S110). Criteria for determining a fraction of bandwidth for reallocation are determined (step S112). The criteria may be stored in allocation criteria memory 28. The criteria may include one or more of a historical bandwidth usage, a priority of a session or a user, a desired quality of service, a cost of reallocation, a probability of default or denial of service, a likelihood that a user will choose a different level of service, a probability that an effective bandwidth exceeds a predetermined threshold, and/or other criteria. Allocation of a fraction of the residual bandwidth is based on the determined criteria (step S114).

Figure 8:
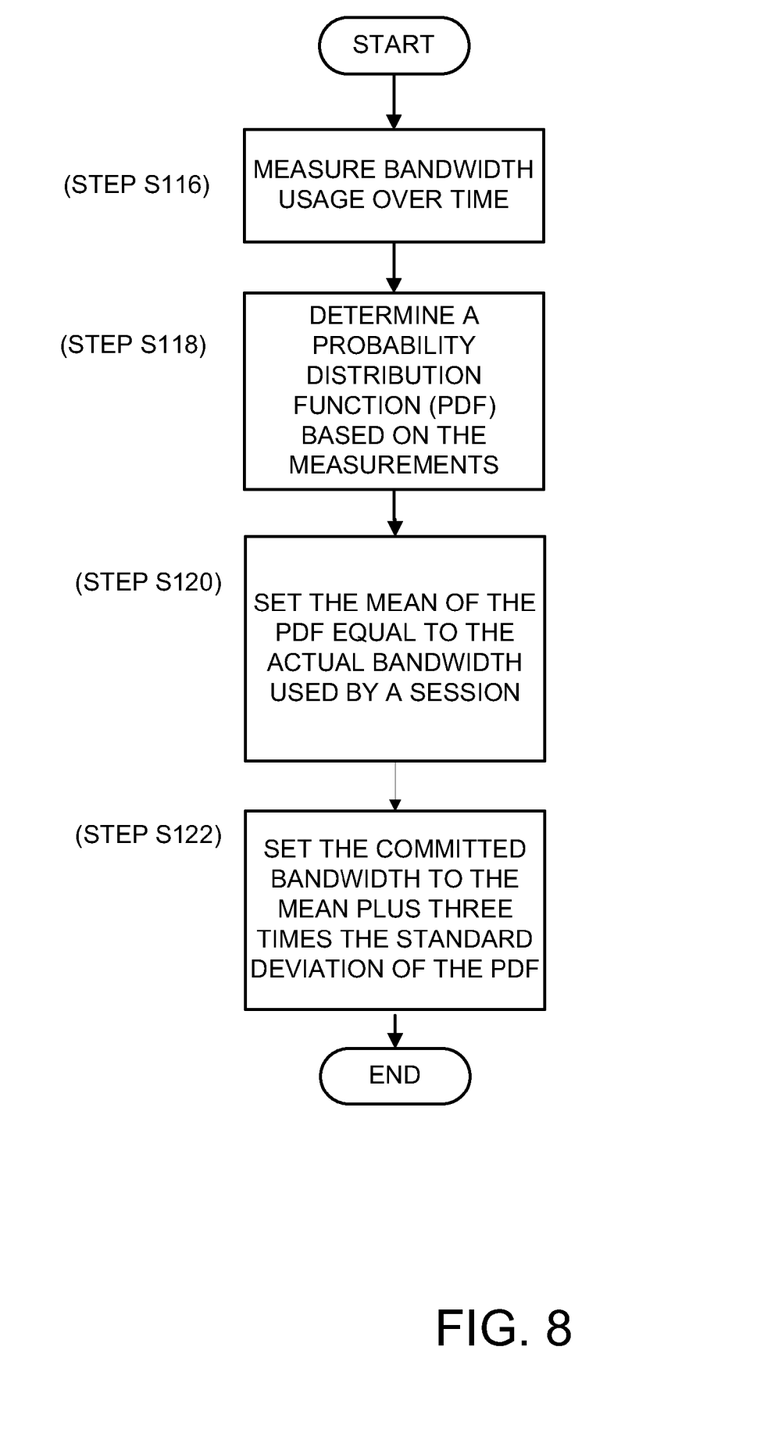
FIG. 8 is flow chart of an exemplary process for determining a bandwidth distribution.

FIG. 8 is a flow chart of another exemplary process for allocating bandwidth to a communication session based on a probability distribution function, as may be implemented by the MMCS 16 of FIG. 1. Bandwidth is measured by the bandwidth determiner 22 of the processor 18 over a period of time (step S116). A probability distribution function (PDF) is determined by the processor 18 based on the measurements (step S118). The mean (average) value of the PDF is set equal to the actual bandwidth used by a session (step S120). The committed bandwidth, which is the amount of bandwidth allocated to the session, may be set equal to three times the standard deviation for the PDF (step S122). However the invention is not limited to this factor. It is contemplated that other factors of the standard deviation, such as 2 or 2.5, may be used.

In one embodiment, when a new user joins a session, the bandwidth allocated to the user may be partitioned into a minimum required bandwidth and an optional bandwidth. The minimal required bandwidth may be based on the observations of bandwidth use over time. The minimal required bandwidth may also be based on a priority of the session or the user, and may be further based on a level of service requested. For example, the user may require audio only, video only, or both audio and video. As another example, the user may require a specific video frame rate and audio data rate. The minimum bandwidth may then be allocated to achieve the required frame and data rates.

Figure 9:
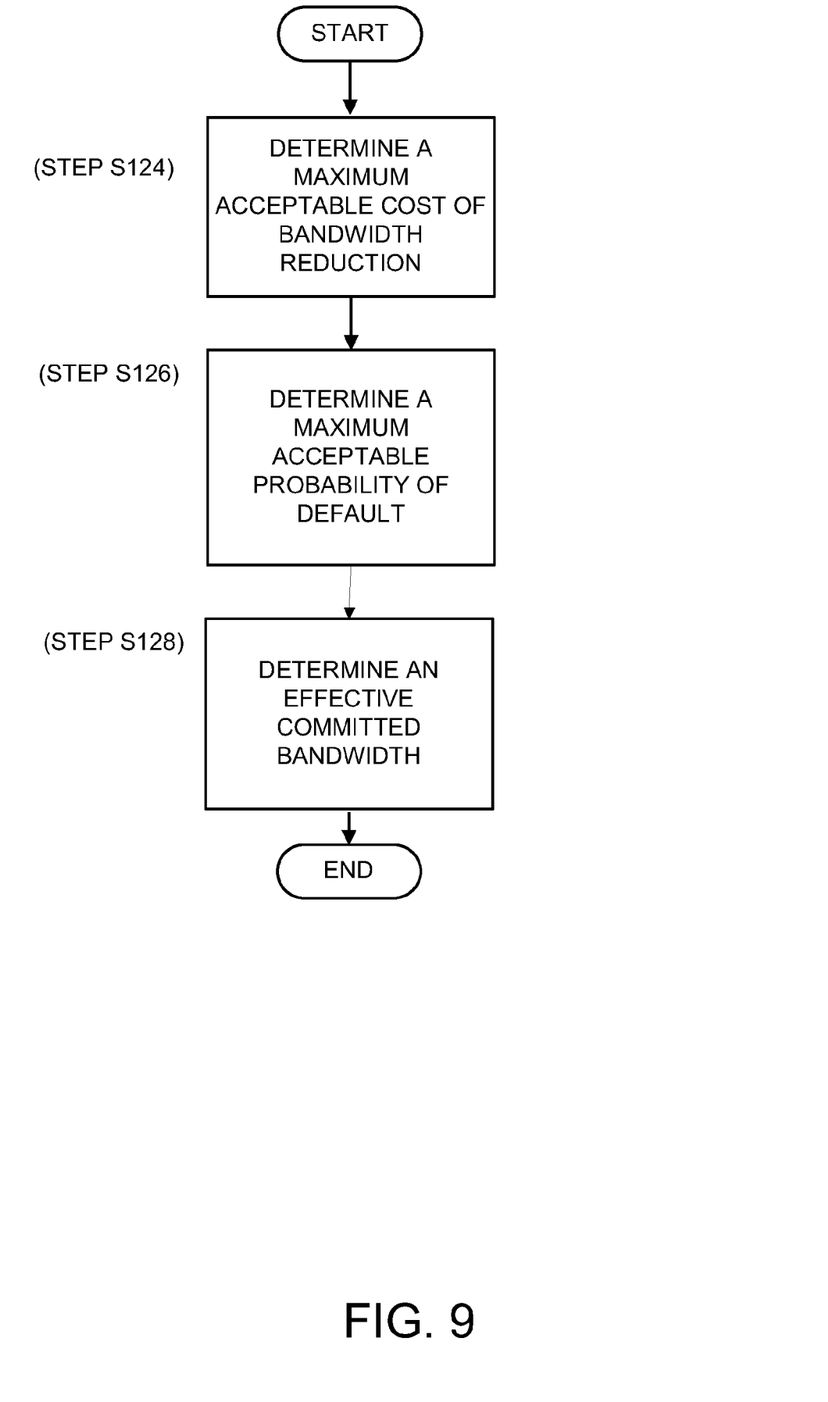
FIG. 9 is a flow chart of an exemplary process for determining an effective committed bandwidth.

FIG. 9 is a flow chart of an exemplary embodiment for determining an effective committed bandwidth based on a cost of bandwidth reduction. The process of FIG. 9 may be implemented by the processor 18 of the MMCS 16, as shown in FIG. 1. An administrator determines a maximum acceptable cost associated with a reduction in bandwidth allocated to a session (step S124). The administrator also determines a maximum acceptable probability of default (step S128). This may be stored as allocation criteria 28 of the memory 20 of the processor 18 of the MMCS 16. Based on the determined maximum acceptable cost and maximum acceptable probability of default, the bandwidth allocator 24 of the processor 18 determines an effective committed bandwidth (step S128). In some embodiments, the effective committed bandwidth may be allocated to a second session by transferring bandwidth allocated to a first session.

One embodiment is a computer readable tangible medium having instructions that when executed by a processor cause the processor to perform operations to allocate bandwidth among a plurality of communication sessions. The operations include determining a residual bandwidth associated with a first communication session. The operations also include allocating a fraction of the residual bandwidth to a second communication session based on predetermined criteria. In some embodiments, the predetermined criteria include a probability that a bandwidth required by the second communication session exceeds a threshold. In another embodiment, the criteria may include a cost associated with reducing a quality of service level assigned to the first session. In yet another embodiment, the predetermined criteria includes a probability of default of the second session. In some embodiments, the predetermined criteria are at least one of a likelihood of a user choosing a lower bandwidth service and a likelihood of a user choosing a higher bandwidth service.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for allocating bandwidth in a communications system that includes a plurality of user equipment, each of the plurality of user equipment being communicatively connected, during a communication session, to a multimedia collaboration server and configured to receive and transmit video and audio data, the multimedia collaboration server allocating a bandwidth to the corresponding communication session of each of the plurality of user equipment, the method comprising:
  performing a first allocation of bandwidth to a first communication session; and
  performing a reallocation of bandwidth from the first communication session to a second communication session based at least in part on a criterion;
    the criterion being a probability that an effective bandwidth of all communication sessions of the plurality of user equipment exceeds a threshold value;
    the effective bandwidth being bandwidth actually used;
    the probability being calculated based on an average of the effective bandwidth over time;
    an amount of bandwidth reallocated from the first communication session to the second communication session being a fraction of a difference between the first allocation and an effective bandwidth used by the first communication session before the reallocation; and
    the effective bandwidth being associated with a mean value of a random variable and the first allocation being the mean value plus a multiple of a standard deviation of the random variable.

2. The method of claim 1, wherein the reallocation of bandwidth includes reducing bandwidth allocated to the first session by removing an optional enhanced attribute of service to the first communication session.

3. The method of claim 2, wherein the enhanced attribute of service is associated with at least one of a first video frame rate, a video data rate, a video resolution, a video signal to noise ratio, and a first audio data rate.

4. The method of claim 1, wherein the reallocation of bandwidth includes increasing bandwidth allocated to the second communication session by adding an optional enhanced attribute of service to the second communication session.

5. The method of claim 1, wherein an amount of bandwidth reallocated is based on a maximum acceptable cost and a maximum acceptable probability of default associated with a communication session.

6. The method of claim 1, wherein the probability is based on at least one of a likelihood that a user will mute audio data, a likelihood that a user will suppress video data, and a likelihood that images will not be sent upstream.

7. A method for allocating bandwidth in a communication system that includes a plurality of users equipment connected during a communication session via a multimedia collaboration server, each user equipment being configured to receive and transmit video and audio data, the server allocating a bandwidth to each of one or more simultaneous communication sessions, the method comprising:
  performing a first allocation of bandwidth to a first communication session; and
  performing a reallocation of bandwidth from the first communication session to a second communication session based at least in part on a criterion,
  the amount of bandwidth reallocated from the first communication session to the second communication session being a fraction of a difference between the first allocation and an effective bandwidth used by the first communication session before the reallocation, and
  the effective bandwidth being associated with a mean value of a random variable and the first allocation is the mean value plus a multiple of a standard deviation of the random variable.

8. A multimedia collaboration server in a communication network, the multimedia collaboration server comprising:
  a memory, the memory storing committed bandwidth, effective bandwidth, and residual bandwidth values for each of a plurality of communication sessions;
  a processor in communication with the memory, the processor configured to:
    store committed bandwidths, effective bandwidths, and residual bandwidths in the memory;
    determine a residual bandwidth that is a difference between a committed bandwidth for a first session of the plurality of communication sessions and an effective bandwidth for the first session; and
    allocate a fraction of the residual bandwidth to a second session of the plurality of communication sessions based at least in part on a criterion;
      the criterion being a probability that an effective bandwidth of all communication sessions of the plurality of communication sessions exceeds a threshold value;
      the effective bandwidth being bandwidth actually used; and
      the probability being calculated based on an average of the effective bandwidth over time;
      the fraction of the residual bandwidth allocated to the second session being a fraction of a difference between a first allocation to the first session and an effective bandwidth used by the first session before allocation to the second session; and
      the effective bandwidth being associated with a mean value of a random variable and the first allocation being the mean value plus a multiple of a standard deviation of the random variable.

9. The multimedia collaboration server of claim 8, wherein the processor is further configured to partition a bandwidth request received upon admission of a user to a session into a minimum required bandwidth and an optional bandwidth.

10. The multimedia collaboration server of claim 9, wherein the optional bandwidth corresponds to an enhanced service layer.

11. The multimedia collaboration server of claim 10, wherein the enhanced service layer corresponds to a specified data rate.

12. The multimedia collaboration server of claim 8, wherein the criterion further includes a probability of default.

13. The multimedia collaboration server of claim 8, wherein the criterion further includes a cost associated with the allocation.

14. A non-transitory computer readable medium having instructions that, when executed by a processor, cause the processor to perform a method of allocating bandwidth, the method comprising:
  determining a residual bandwidth associated with a first communication session; and
  allocating a fraction of the residual bandwidth to at least a second communication session based at least in part on a criterion;
    the criterion being a probability that an effective bandwidth of all communication sessions exceeds a threshold value;

the effective bandwidth being bandwidth actually used; and the probability being calculated based on an average of the effective bandwidth over time;

the fraction of the residual bandwidth allocated to the second communication session being a fraction of a difference between a first allocation to the first communication session and an effective bandwidth used by the first communication session before allocation to the second communication session; and the effective bandwidth being associated with a mean value of a random variable and the first allocation being the mean value plus a multiple of a standard deviation of the random variable.

15. The computer readable medium of claim 14, wherein the criterion further includes a cost associated with reducing a quality of service level assigned to the first session.

16. The computer readable medium of claim 14, wherein the criterion further includes a probability of default of the second session.

17. The computer readable medium of claim 14, wherein the criterion further includes at least one of a likelihood of a user choosing a lower bandwidth service and a likelihood of a user choosing a higher bandwidth service.

* * * * *